United States Patent
Hsu et al.

(10) Patent No.: US 9,002,280 B2
(45) Date of Patent: Apr. 7, 2015

(54) INTERCELL FREQUENCY OFFSET COMPENSATION FOR FREQUENCY DOMAIN INTERFERENCE CANCELLATION AND EQUALIZATION FOR DOWNLINK CELLULAR SYSTEMS

(75) Inventors: Steve H. Hsu, San Diego, CA (US); Raheel Khan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 13/562,621

(22) Filed: Jul. 31, 2012

(65) Prior Publication Data
US 2013/0184018 A1 Jul. 18, 2013

Related U.S. Application Data (60) Provisional application No. 61/586,915, filed on Jan. 16, 2012.

(51) Int. Cl.
*H04B 1/00* (2006.01)
*H04J 11/00* (2006.01)
*H04L 25/03* (2006.01)
*H04L 27/26* (2006.01)

(52) U.S. Cl.
CPC ......... *H04L 25/03273* (2013.01); *H04J 11/005* (2013.01); *H04L 25/0328* (2013.01); *H04L 27/2657* (2013.01)

(58) Field of Classification Search
USPC ............... 455/506, 244.1, 206, 63.1
See application file for complete search history.

(56) References Cited

U.S. PATENT DOCUMENTS

| | | |
|---|---|---|
| 6,400,781 B1 * | 6/2002 | Vandendorpe et al. ....... 375/350 |
| 6,522,702 B1 | 2/2003 | Maruyama |
| 6,567,833 B2 | 5/2003 | Van et al. |
| 6,912,248 B1 | 6/2005 | Wakabayashi |
| 7,639,761 B2 | 12/2009 | Chu et al. |
| 7,773,683 B2 | 8/2010 | Tseng et al. |
| 7,787,557 B2 | 8/2010 | Kim et al. |
| 7,848,460 B2 | 12/2010 | Ramesh |

(Continued)

FOREIGN PATENT DOCUMENTS

| | | |
|---|---|---|
| WO | 2011002079 A1 | 1/2011 |
| WO | 2011054369 A1 | 5/2011 |

OTHER PUBLICATIONS

Dinis R., et al., "Joint turbo equalisation and carrier synchronisation for SC-FDE schemes", European Transactions on Telecommunications, Wiley & Sons, Chichester, GB, vol. 21, No. 2, Mar. 1, 2010, pp. 131-141, XP001552238, ISSN: 1124-318X, DOI: 10.1002/ETT. 1377 [retrieved on Feb. 3, 2010].

(Continued)

Primary Examiner — Tu X Nguyen
(74) Attorney, Agent, or Firm — Donald C. Kordich (57) ABSTRACT

Methods and apparatus are described for interference cancellation of interference components of a time domain signal in the frequency domain. A time domain sequence is received, and a plurality of overlapping time domain segments is generated from the time domain sequence. Frequency offset compensation to compensate for frequency offset associated with a serving cell is performed in the time domain, and the overlapping time domain segments are then converted to the frequency domain. Additional frequency offset compensation may be performed to compensation for the frequency offset associated with interfering cells.

18 Claims, 5 Drawing Sheets

(56) References Cited

U.S. PATENT DOCUMENTS

| | | | |
|---|---|---|---|
| 8,009,746 | B2 | 8/2011 | Ko et al. |
| 8,085,840 | B2 | 12/2011 | Saints et al. |
| 2009/0323796 | A1 | 12/2009 | Futatsugi et al. |
| 2011/0150153 | A1* | 6/2011 | Liu et al. .................. 375/348 |
| 2011/0286559 | A1 | 11/2011 | Peng et al. |
| 2012/0093272 | A1 | 4/2012 | Kimata |
| 2012/0121002 | A1* | 5/2012 | Liu et al. .................. 375/227 |
| 2013/0184019 | A1 | 7/2013 | Khan et al. |

OTHER PUBLICATIONS

Huang D., et al., "An Interference-Cancellation Scheme for Carrier Frequency Offsets Correction in OFDMA Systems", IEEE Transactions on Communications, Service Center, Piscataway, NJ. USA, vol. 53, No. 7, Jul. 1, 2005, pp. 1155-1165, XP011136462, ISSN: 0090-6778, DOI: 10.1109/TCOMM.2005.851558.

Hwang, J.K., et al., "A New π/4-DQPSK Single Carrier System with Cyclic Prefix and Frequency Domain Equalizer: Merits and Applications", Consumer Electronics, 2005, IEEE, Jun. 14, 2005, pp. 271-275, XP010832158, DOI:'10.1109/ISCE.2005.1502384, ISBN: 978-0-7803-8920-5.

International Search Report and Written Opinion—PCT/US2013/021726—ISA/EPO—May 2, 2013.

Kalbasi R., et al., "Layered space-time receivers for single-carrier transmission with iterative frequency-domain equalization", Proceedings / 2004 IEEE 59th Vehicular Technology Conference, VTC 2004—Spring : Towards a Global Wireless World ; May 17-19, 2004, Milan, Italy, IEEE Operations Center, Piscataway, NJ, vol. 1, May 17, 2004, pp. 575-579 vol. 1 , XP010764863, DOI: 10.1109/VETECS.2004.1388018 ISBN: 978-0-7803-8255-8.

Miao R., et al., "A Novel Interference Cancellation Approach for Interleaved OFDMA Uplink System", IEICE Transactions on Communications, Communications Society, Tokyo, JP, vol. E92B, No. 11, Nov. 1, 2009, pp. 3432-3438, XP001550921, ISSN: 0916-8516, DOI: 10.1587/Transcom.E92.B.3432.

Suryani, T., et al., "ICI mitigation with CFO compensation for OFDM in mobile-to-mobile channel", ICT Convergence, IEEE, Sep. 28, 2011, pp. 430-435, XP032011341, DOI:10.1109/ICTC.2011.6082632, ISBN: 978-1-4577-1267-8.

Tomasin S., "Overlap and Save Frequency Domain DFE for Throughput Efficient Single Carrier Transmission", Personal, Indoor and Mobile Radio Communications, 2005, IEEE, vol. 2, Sep. 11, 2005, pp. 1199-1203,XP010926514, DOI: 10.1109/PIMRC.2005.1651631, ISBN: 978-978-38007-2-4.

White, N.B., et al., "Low cost MMSE algorithm for UTRA TDD mode downlink receiver", Electronics Letters, IEEE, vol. 34, No. 21, Oct. 15, 1998, pp. 2009-2010, XP006010471, ISSN: 0013-5194, DOI: 10.1049/EL19981438.

\* cited by examiner

INTERCELL FREQUENCY OFFSET COMPENSATION FOR FREQUENCY DOMAIN INTERFERENCE CANCELLATION AND EQUALIZATION FOR DOWNLINK CELLULAR SYSTEMS

CLAIM OF PRIORITY UNDER 35 U.S.C. §119

The present Application for Patent claims priority to Provisional Application No. 61/586,915 entitled "Intercell Frequency Offset Compensation for Frequency Domain Interference Cancellation and Equalization for Downlink Cellular Systems" filed Jan. 16, 2012, and assigned to the assignee hereof and hereby expressly incorporated by reference herein.

REFERENCE TO CO-PENDING APPLICATIONS FOR PATENT

The present Application for Patent is related to co-pending U.S. patent application Ser. No. 13/563,203 entitled "Frequency Domain Interference Cancellation and Equalization for Downlink Cellular Systems," filed concurrently herewith, assigned to the assignee hereof, and expressly incorporated by reference herein.

BACKGROUND

This application relates generally to interference cancellation, and more particularly to performing interference cancellation in the frequency domain for downlink cellular systems.

Interference of downlink cellular systems coming from multipath and co-channel interference from adjacent base stations is a common problem. To address these problems, conventional systems separate interference components from the received signals, estimate channel impulse responses, equalize the channel impulse response, and then attempt to reconstruct the signals. Each of these operations is typically performed in the time domain, and such operations are multiplier-intensive, resulting in high implementation complexity and power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with some aspects, a method for interference cancellation of interference components of a time domain signal in the frequency domain is described. The method may include receiving a time domain sequence and generating a plurality of overlapping time domain segments from the time domain sequence. The method may also include performing a serving cell frequency compensation operation on the overlapping time domain segments to compensate for frequency offset associated with a serving cell, and converting the plurality of overlapping time domain segments into a plurality of frequency domain segments. In addition, the method may include performing a first interference cell frequency offset compensation operation during an equalization phase of the interference cancellation, and performing a second interference cell frequency offset compensation operation during a reconstruction phase of the interference cancellation.

In other related aspects, a computer readable medium may have at least one instruction executable by a computer to perform the acts of the above-noted method, an apparatus may include at least one means for performing the acts of the above-noted method, and an apparatus may include at least one processor for performing the acts of the above-noted method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The apparatus and methods described herein are configured to reduce the complexity and power consumption associated with interference cancellation by using an interference cancellation structure that performs signal equalization, reconstruction, and interference cancellation in the frequency domain. A signal is converted from the time-domain to the frequency domain once, and is subsequently kept in the frequency domain between successive processing iterations. Interference estimates are converted to the frequency domain and interference cancellation is performed in the frequency domain. Variances in the carrier frequency offset associated with each cell transmitting a signal are compensated for.

Figure 1:
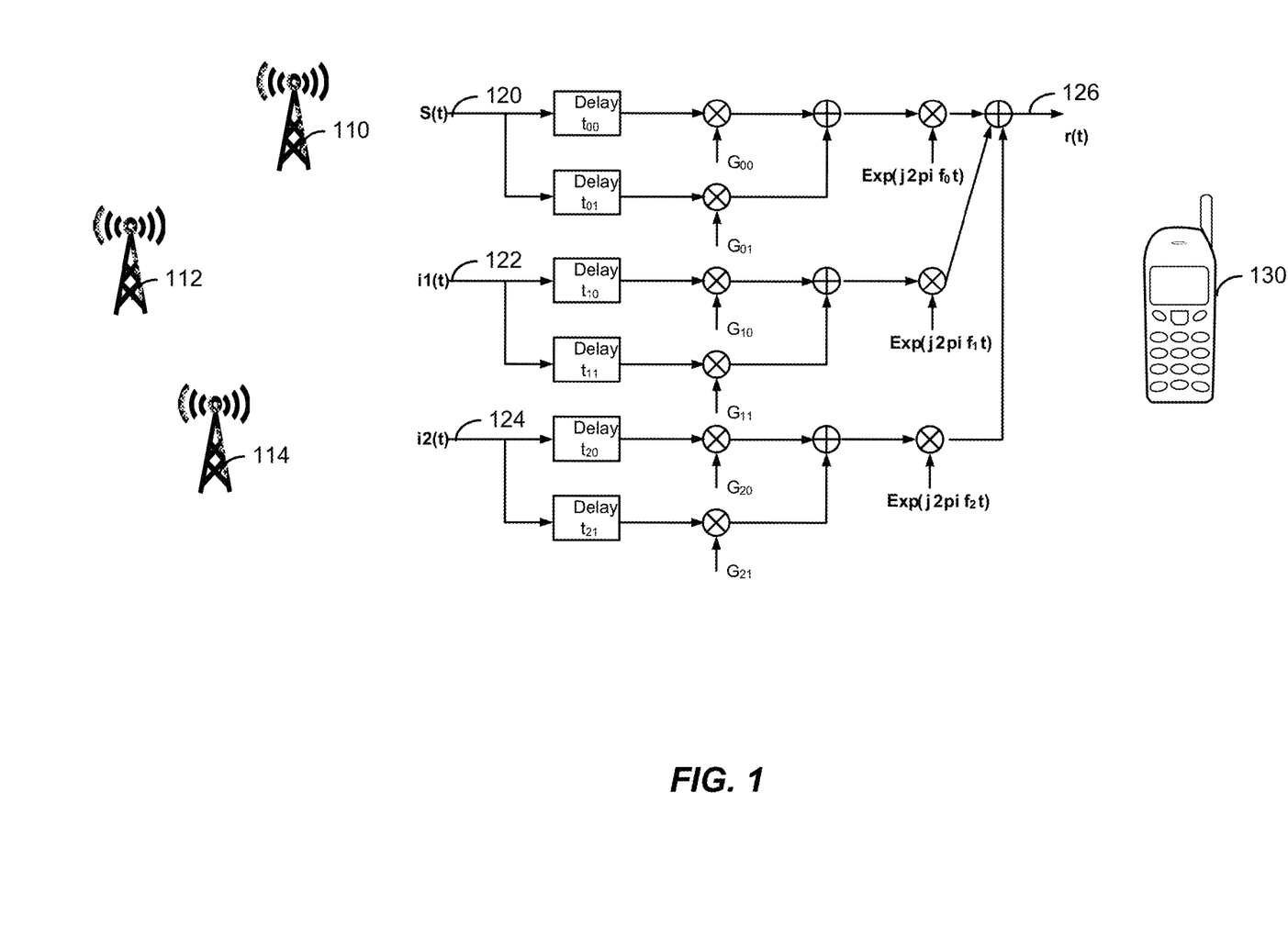
FIG. 1 depicts a communication system, in accordance with various disclosed aspects.

FIG. 1 depicts an example of a communications system that may implement various aspects of this disclosure. A plurality of base stations, shown as base stations 110, 112, and 114 may be within communicating range of a wireless communications device 130. For example, base station 110 may be a serving cell communicating with wireless communications device 130. Base stations 112 and 114 may be located in neighboring cells, and due to the proximity of the neighboring cells, wireless communications device 130 may receive signals from the neighboring cells, which appear as interference to wireless communications device 130. Each of base stations 110, 112, and 114 may have a different carrier frequency offset associated therewith.

As shown at 120, the signal transmitted by base station 110, shown as S(t), may experience delays associated with the communications channel, including, for example, multipath delays. Interference signal i1(t), shown at 122 and transmitted by base station 112, and interference signal i2(t), shown at 124 and transmitted by base station 114, are combined with the actual data signal transmitted by base station 110. As such, communications device 130 receives a signal r(t), shown at 126, which includes interference components.

Figure 2:
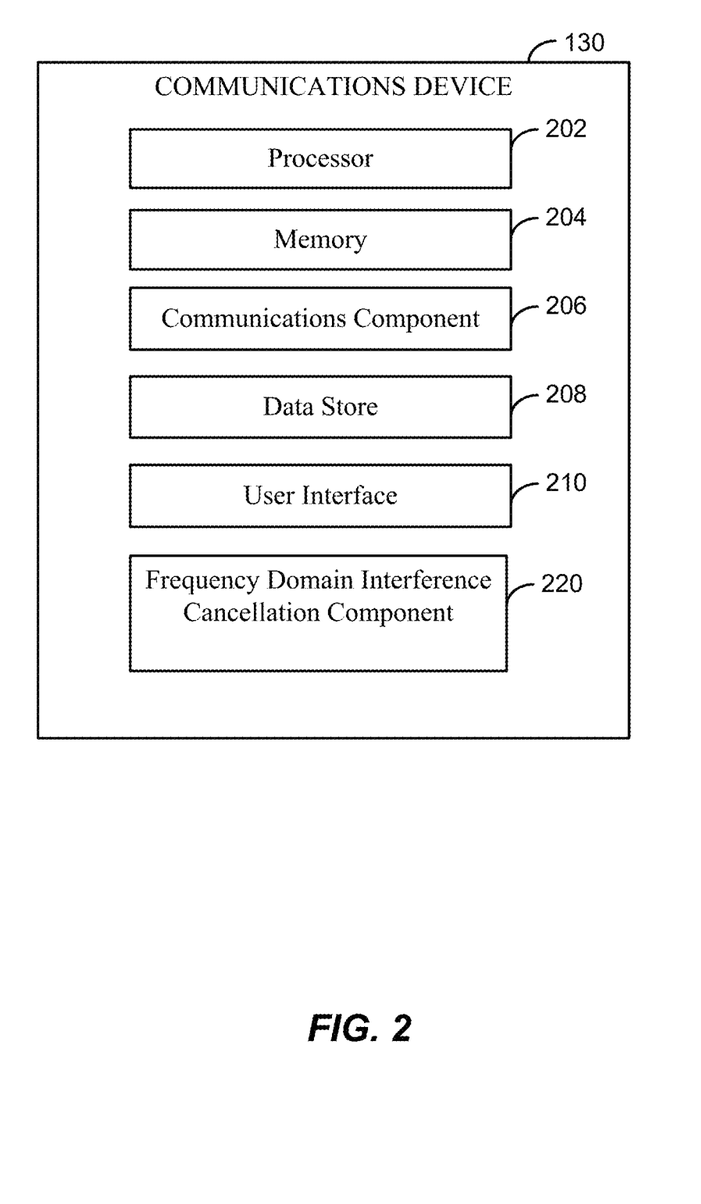
FIG. 2 depicts a communications device, in accordance with various disclosed aspects.

FIG. 2 depicts communications device 130 in greater detail, according to one aspect. Communications device 130 may include a processor 202 for carrying out processing functions associated with one or more of the components and functions described herein. Processor 202 can include a single or multiple set of processors or multi-core processors. Moreover, processor 202 can be implemented as an integrated processing system and/or a distributed processing system.

Communications device 130 further includes a memory 204, such as for storing data used herein and/or local versions of applications being executed by processor 202. Memory 204 can include any type of memory usable by a computer, such as random access memory (RAM), read only memory (ROM), tapes, magnetic discs, optical discs, volatile memory, non-volatile memory, and any combination thereof. Applications may include, for example, one or more object matching applications.

Further, communications device 130 may include a communications component 206 that provides means for establishing and maintaining communications with one or more parties utilizing hardware, software, and services as described herein. Communications component 206 may carry communications between components on communications device 130, as well as between communications device 130 and external devices, such as devices located across a communications network and/or devices serially or locally connected to communications device 130. For example, communications component 206 may include one or more buses, and may further include transmit chain components and receive chain components associated with a transmitter and receiver, respectively, operable for interfacing with external devices such as base stations 110, 112, and 114.

Additionally, communications device 130 may further include a data store 208, which can be any suitable combination of hardware and/or software, that provides for mass storage of information, databases, and programs employed in connection with aspects described herein. For example, data store 208 may be a data repository for applications not currently being executed by processor 202. In some aspects, data store 208 may be located within memory 204.

Communications device 130 may additionally include a user interface component 210 operable to receive inputs, or serving as an application programming interface (API), and may be further operable to generate outputs for presentation to the user. User interface component 210 may include one or more input devices, including but not limited to a keyboard, a number pad, a mouse, a touch-sensitive display, a navigation key, a function key, a microphone, a voice recognition component, a still camera, a video camera, an audio recorder, and/or any other mechanism capable of receiving an input, or any combination thereof. Further, user interface component 210 may include one or more output devices, including but not limited to a display, a speaker, a haptic feedback mechanism, a printer, any other mechanism capable of presenting an output, or any combination thereof. Communications device 130 may also include a frequency domain interference cancellation component 220. Frequency domain interference cancellation component 220 may be configured to equalize, reconstruct, and remove interference components from a received signal in the frequency domain, and to compensate for differences in frequency offset when performing interference cancellation.

Figure 3:
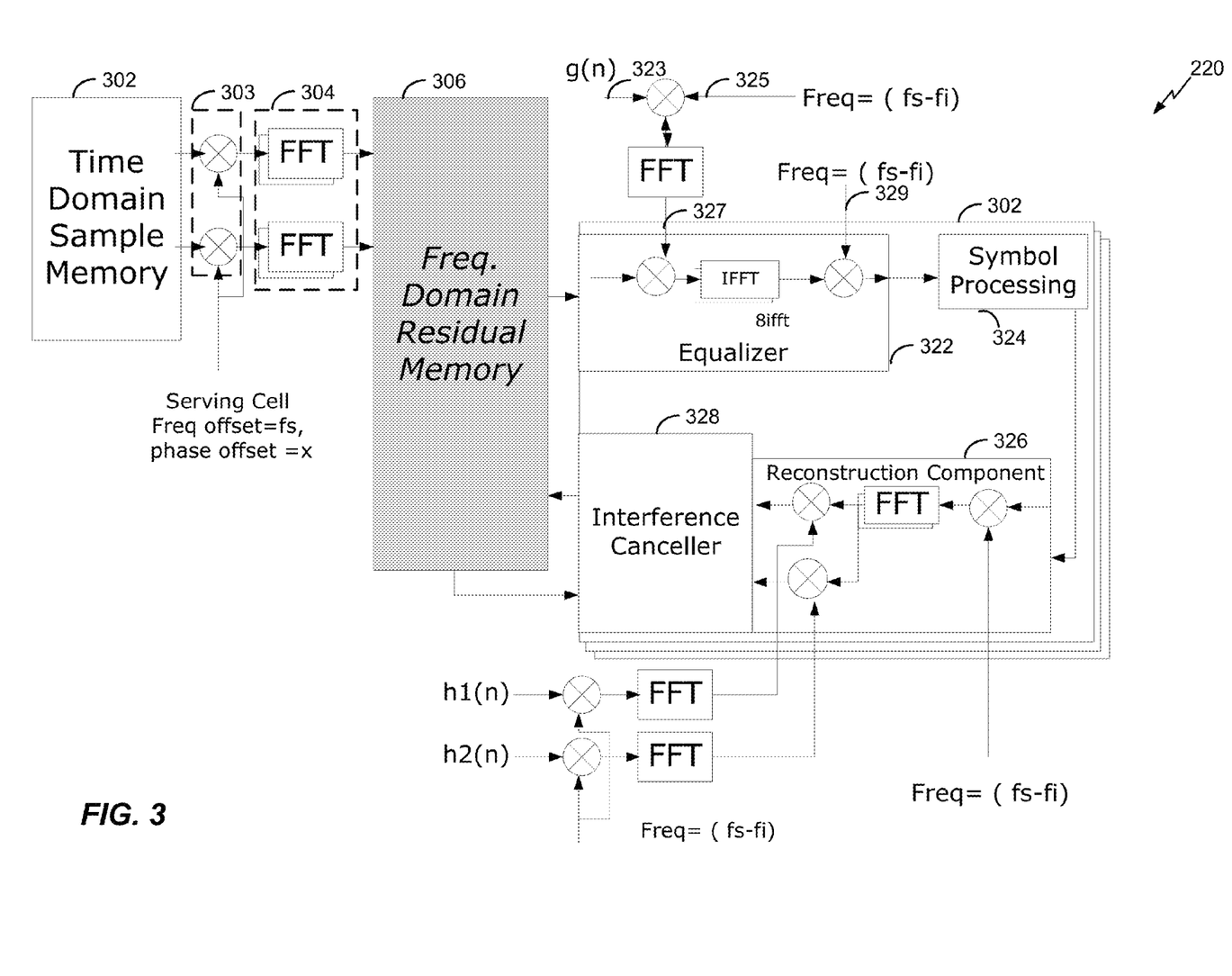
FIG. 3 depicts a frequency domain interference cancellation component, in accordance with various disclosed aspects.

Referring now to FIG. 3, frequency domain interference cancellation component 220 is described in further detail. Frequency domain interference cancellation component 220 may include a time domain sample memory 302, a frequency domain segment generation component 304, a frequency domain residual memory 306, and an interference processing component 320. Interference processing component 320 may include an equalization component 322, a symbol processing component 324, a reconstruction component 326, and an interference canceller 328.

Time domain sample memory 302 may be configured to receive a sampled time domain sequence, which may be viewed as a plurality of overlapping time domain segments. Each time domain segment may comprise overlapping samples. That is, each segment may include a number of samples overlapping with adjacent segments. For example, each segment may contain 128 samples with 32 samples overlapping with an adjacent segment. In accordance with some aspects, the overlapping time domain segments may generated using an overlap-and-save, overlap-and-add, or any other technique for generating overlapping segments. When processing samples related to data transmitted from the serving cell, the samples in the overlapping time domain segments may have the serving cell carrier frequency offset compensated for, for example, by multiplying the samples with a complex sinusoid having a frequency equal to the serving cell carrier frequency offset, as shown at 303. A frequency domain segment generation component 304 may be configured to convert the overlapping time domain segments into the frequency domain after the frequency offset compensation has been performed in the time domain resulting in frequency domain representations of the overlapping time domain segments. For example, as shown in FIG. 3, a plurality of Fast Fourier Transforms (FFTs) may be performed to convert the time domain segments into frequency domain segments. While FFTs are shown in this example, other frequency conversion operations may be performed. The frequency domain segments may be stored in frequency domain residual memory 306.

For a given segment, all samples contributing to a portion of interest of that segment may be output to equalizer 322. When processing samples associated with an interfering cell, an impulse response 323, shown as g(n), may be multiplied by a complex sinusoid 325 having a frequency value equal to the difference between the serving cell frequency offset and the interference cell frequency offset, and the result of the multiplication may converted to the frequency domain and applied as a second input 327 to the equalizer 322. The samples may be multiplied with the second input 327, which serves as the frequency response of the equalizer filter taps, to remove multipath, and then converted back to the time domain.

After converting the equalized samples to the time domain, the output may again be multiplied by a complex sinusoid having a frequency equal to the difference between the serving cell frequency offset and the interference cell frequency offset, as shown at 329. The time domain samples may then be output to symbol processing component 324.

Symbol processing component 324 may be configured to generate an estimate of a transmitted waveform. For example, symbol processing component 324 may be configured to apply a linear minimum mean square error (MMSE) process to reduce noise in the signal and to obtain the estimate. The estimate of the transmitted waveform may be output to reconstruction component 326, which may be configured to create a frequency domain estimate of the received signal. Reconstruction component 326 may be configured to multiply the estimate of the transmitted waveform with a complex sinusoid with a frequency equal to the difference between the serving cell frequency offset and the interference cell frequency offset. After the multiplication, the output may be transformed from the time domain to the frequency domain, by performing an FFT, for example, to generate a frequency domain estimate of the transmitted waveform.

The reconstruction component 326 may then multiply the frequency domain estimate of the transmitted waveform with a frequency domain estimate of one or more reconstruction filter taps, shown in FIG. 3 as h1(n) and h2(n). To account for frequency offset, the reconstruction filter taps h1(n) and h2(n) may be multiplied with a complex sinusoid equal to the difference between the serving cell frequency offset and the interference cell frequency offset, prior to being converted to the frequency domain. The output of reconstruction component 326 is a frequency domain estimate of the received signal.

Interference canceller 328 receives the frequency domain estimate of the received signal, and may use this estimate to remove interference components associated with the given segment directly from the residual memory in the frequency domain. That is, the interference canceller 328 may be configured to compare the frequency domain representation of the received waveform, stored in the frequency domain residual memory 306, with the determined frequency domain estimate of the received signal to remove interference contributions. The process may be repeated for additional segments until all contribution of interference sources have been removed.

Figure 4:
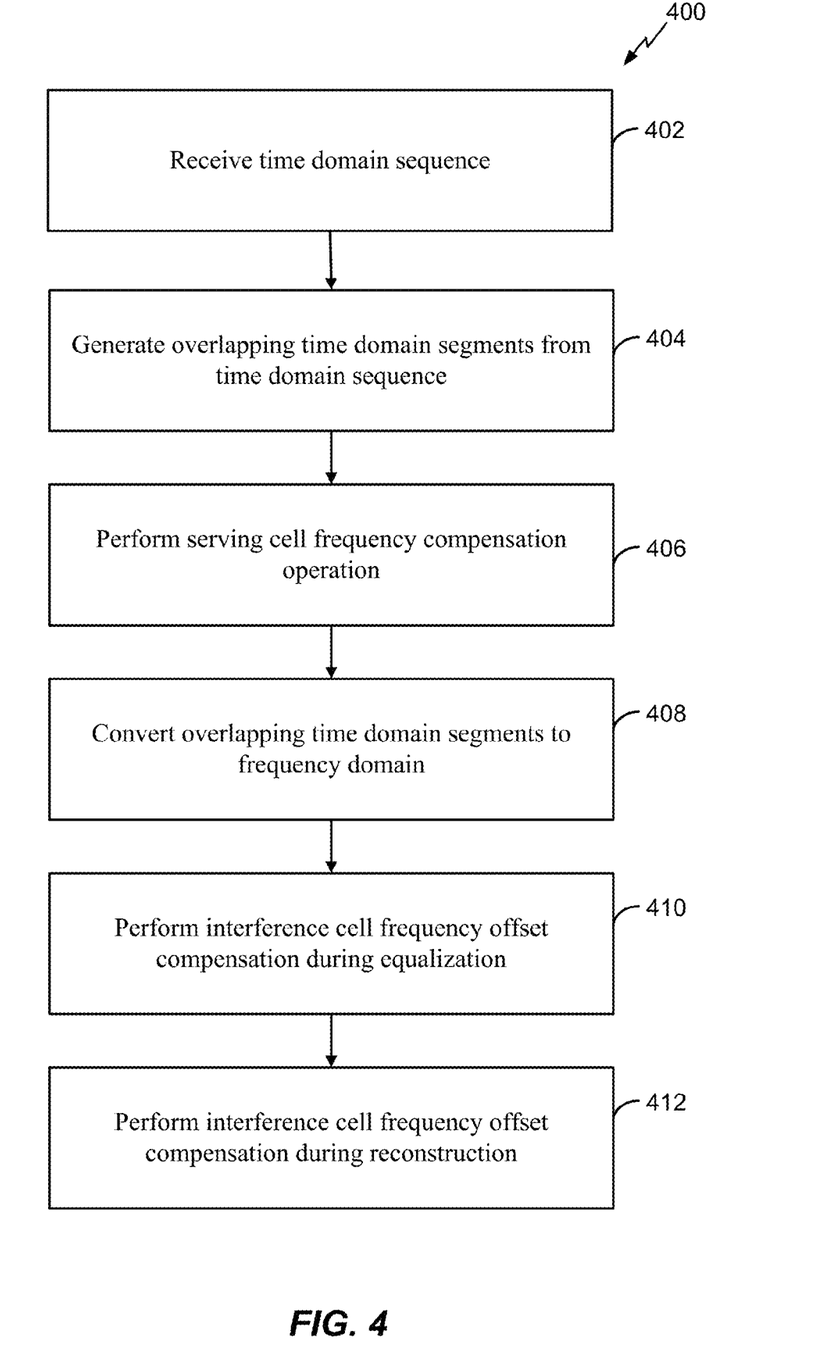
FIG. 4 is a flowchart depicting a method of frequency offset compensation, in accordance with various disclosed aspects.

Turning now to FIG. 4, a method 400 for frequency offset compensation when performing interference cancellation in the frequency domain is illustrated. In accordance with some aspects, method 400 may be implemented by communications device 130. As depicted at 402, a time domain sequence may be received. The time domain sequence may include data transmitted by a serving cell serving communications device 130 as well as data representing interference from one or more neighboring cells.

As shown at 404, overlapping time domain segments may be generated from the time domain sequence. For example, the time domain sequence may be segmented into a plurality of time domain segments, each segment having samples overlapping with an adjacent segment. A serving cell frequency compensation operation may be performed, as shown at 406. For example, the serving cell frequency compensation operation may include multiplying the time domain segments with a complex sinusoid having a frequency equal to the frequency offset associated with the serving cell. The time domain segments may then be converted into the frequency domain by applying one or more FFTs, for example, as shown at 408. As shown at 410, a first operation may be performed to compensate for the frequency offset during an equalization phase of the interference cancellation. For example, the first operation may include equalizing the frequency domain samples using a frequency transform of equalizer taps that have been multiplied by a complex sinusoid having a frequency equal to the difference between the serving cell frequency offset and the interference cell frequency offset, when processing interference cell segments. As shown at 412, a second operation may be performed to compensate for frequency offset during a reconstruction phase of the interference cancellation. For example, the second operation may include reconstructing the frequency domain samples using frequency domain representations of equalizer taps that have been multiplied by a complex sinusoid having a frequency equal to the difference between the serving cell frequency offset and the interference cell frequency offset, when processing interference cell segments.

Figure 5:
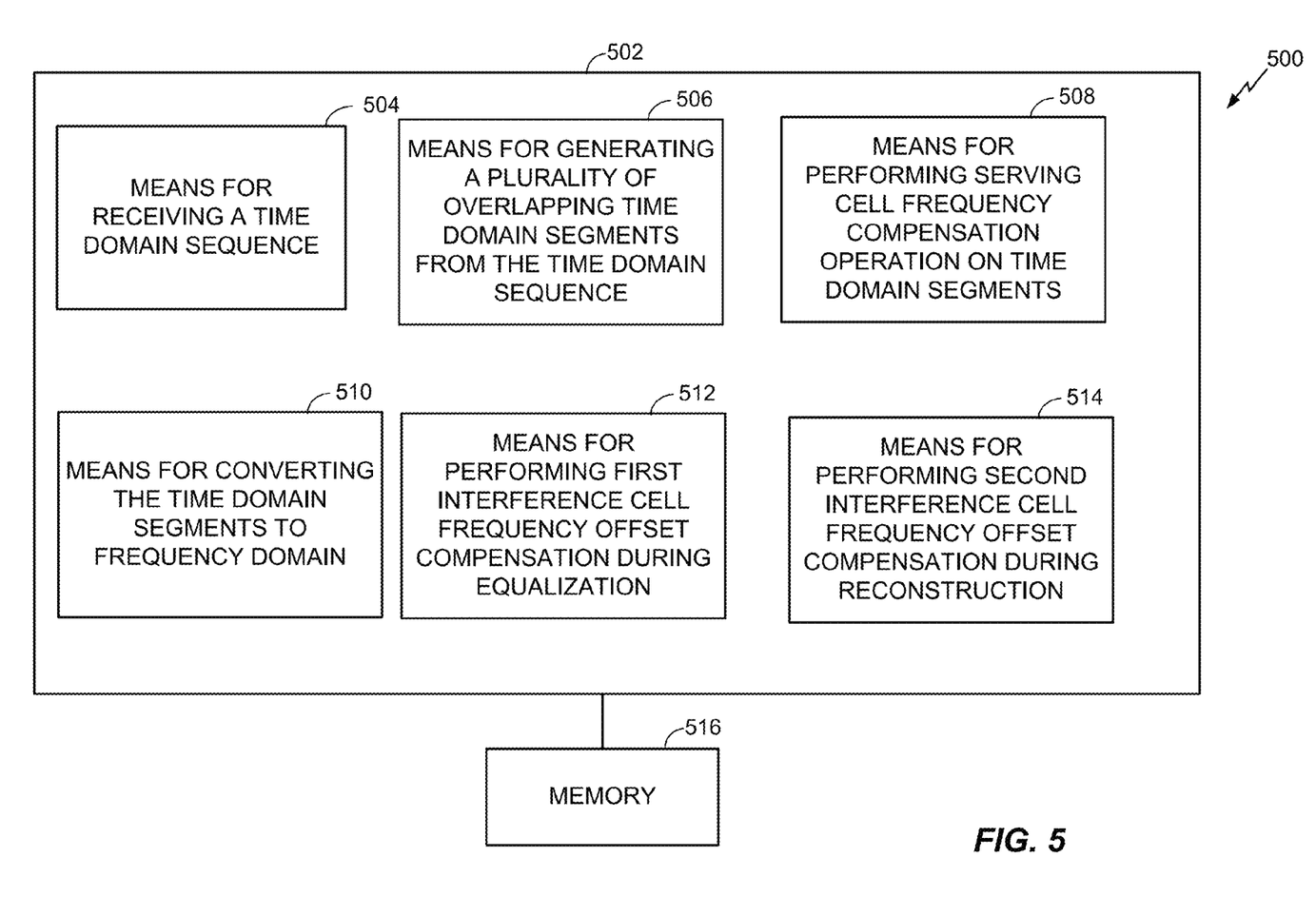
FIG. 5 depicts an apparatus for frequency offset compensation, in accordance with various disclosed aspects.

Referring now to FIG. 5, an apparatus 500 for performing frequency offset compensation for frequency domain interference cancellation is shown. The apparatus 500 can reside at least partially within communications device 130, according to one aspect. It is to be appreciated that apparatus 500 is represented as including functional blocks, which can represent functions implemented by a processor, software, or combination thereof (e.g., firmware). As such, apparatus 500 includes a logical grouping 502 of electrical components that can act in conjunction. For instance, logical grouping 502 may include means for receiving a time domain sequence (Block 504). For example, in an aspect, the means 504 can include time domain sample server 302, communications component 206, and/or processor 202. Logical grouping 502 can include means for generating overlapping time domain segments from the time domain sequence (Block 506). For example, in an aspect, the means 506 may include time domain sample server 302, frequency domain sample generation component 304, and/or processor 202. Logical grouping 502 can also include means for performing a serving cell frequency compensation operation on the overlapping time domain segments to compensate for frequency offset associated with a serving cell (Block 508). For example, in an aspect, the means 508 can include frequency domain interference cancellation component 220 and/or processor 302. Further, logical grouping 502 can include means for converting the plurality of overlapping time domain segments into a plurality of frequency domain segments (Block 510). In an aspect, the means 510 may include frequency domain sample generation component 304 and/or processor 202. Logical grouping 502 can also include means for performing a first interference cell frequency offset compensation operation during an equalization phase of the interference cancellation when processing segments from an interfering cell (Block 512). In an aspect, the means 512 may include frequency domain interference cancellation component 220 and/or processor 302. The logical grouping 502 may additionally include means for performing a second interference cell frequency offset compensation operation during a reconstruction phase of the interference cancellation when processing segments from an interfering cell (Block 514). In an aspect, the means 514 may include frequency domain interference cancellation component 220 and/or processor 302.

Additionally, apparatus 500 can include a memory 516 that retains instructions for executing functions associated with blocks 504-514. While shown as being external to memory 516, it is to be understood that one or more of blocks 504-514 can exist within memory 516. In an aspect, for example, memory 516 may be the same as or similar to memory 204 or data store 208 (FIG. 2).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for interference cancellation of interference components of a time domain signal in the frequency domain, comprising:
    receiving a time domain sequence;
    generating a plurality of overlapping time domain segments from the time domain sequence;
    performing a serving cell frequency compensation operation on the overlapping time domain segments to compensate for frequency offset associated with a serving cell;
    converting the plurality of overlapping time domain segments into a plurality of frequency domain segments;
    performing a first interference cell frequency offset compensation operation during an equalization phase of the interference cancellation; and
    performing a second interference cell frequency offset compensation operation during a reconstruction phase of the interference cancellation.

2. The method of claim 1, wherein performing a serving cell frequency compensation operation comprises multiplying each time domain segment by a complex sinusoid with a frequency equal to the serving cell frequency offset.

3. The method of claim 1, wherein the first interference cell frequency offset compensation operation comprises equalizing the frequency domain segments using equalizer taps that have been multiplied by a complex sinusoid with frequency equal to the difference between the serving cell frequency offset and the interference cell frequency offset.

4. The method of claim 1, wherein the second interference cell frequency offset compensation operation comprises reconstructing the frequency domain segments using equalizer taps multiplied by a complex sinusoid with a frequency equal to the difference between the serving cell frequency offset and the interference cell frequency offset.

5. The method of claim 1, further comprising:
    converting the frequency domain segments to time domain after performing the first operation;
    multiplying the time domain segments with a complex sinusoid having a frequency equal to the difference between the serving cell frequency offset and the interference cell frequency offset; and
    obtaining an estimated value of a transmitted signal using the time domain segments.

6. The method of claim 5, further comprising
    converting the estimated value to frequency domain; and
    directly removing the interference components from the frequency domain segments.

7. The method of claim 1, wherein the interference components comprise co-channel interference.

8. The method of claim 1, wherein the interference components are due to a multipath fading channel.

9. A non-transitory computer-readable medium, comprising:
    at least one instruction for causing a computer to:
        receive a time domain sequence;
        generate a plurality of overlapping time domain segments from the time domain sequence;
        perform a serving cell frequency compensation operation on the overlapping time domain segments to compensate for frequency offset associated with a serving cell;
        convert the plurality of overlapping time domain segments into a plurality of frequency domain segments;
        perform a first interference cell frequency offset compensation operation during an equalization phase of the interference cancellation; and
        perform a second interference cell frequency offset compensation operation during a reconstruction phase of the interference cancellation.

10. An apparatus, comprising:
    means for receiving a time domain sequence;
    means for generating a plurality of overlapping time domain segments from the time domain sequence;
    means for performing a serving cell frequency compensation operation on the overlapping time domain segments to compensate for frequency offset associated with a serving cell;
    means for converting the plurality of overlapping time domain segments into a plurality of frequency domain segments;
    means for performing a first interference cell frequency offset compensation operation during an equalization phase of the interference cancellation; and
    means for performing a second interference cell frequency offset compensation operation during a reconstruction phase of the interference cancellation.

11. An apparatus for compensating for frequency offset for interference cancellation of interference components of a time domain signal in the frequency domain, comprising:
    at least one processor configured to:
        receive a time domain sequence;
        generate a plurality of overlapping time domain segments from the time domain sequence;
        perform a serving cell frequency compensation operation on the overlapping time domain segments to compensate for frequency offset associated with a serving cell;
        convert the plurality of overlapping time domain segments into a plurality of frequency domain segments;
        perform a first interference cell frequency offset compensation operation during an equalization phase of the interference cancellation; and
        perform a second interference cell frequency offset compensation operation during a reconstruction phase of the interference cancellation; and
    a memory coupled to the at least one processor.

12. The apparatus of claim 11, wherein the processor is further configured to perform the serving cell frequency compensation operation by multiplying each time domain segment by a complex sinusoid with a frequency equal to the serving cell frequency offset.

13. The apparatus of claim 11, wherein the processor is further configured to perform the first interference cell frequency offset compensation operation by equalizing the frequency domain segments using equalizer taps that have been multiplied by a complex sinusoid with a frequency equal to the difference between the serving cell frequency offset and the interference cell frequency offset.

14. The apparatus of claim 11, wherein the processor is further configured to perform the second interference cell frequency offset compensation operation by reconstructing the frequency domain segments using equalizer taps that have been multiplied by a complex sinusoid with a frequency equal to the difference between the serving cell frequency offset and the interference cell frequency offset.

15. The apparatus of claim 11, wherein the processor is further configured to:

convert the frequency domain segments to time domain after performing the first operation;

multiply the time domain segments with a complex sinusoid having a frequency equal to the difference between the serving cell frequency offset and the interference cell frequency offset; and obtain an estimated value for a transmitted signal using the time domain segments.

16. The apparatus of claim 15, wherein the processor is further configured to:

convert the estimated value for the time domain segments to the frequency domain;

directly remove the interference components from the frequency domain segments.

17. The apparatus of claim 11, wherein the interference components comprise co-channel interference.

18. The apparatus of claim 11, wherein the interference components are due to a multipath fading channel.

* * * * *